(12) United States Patent
Bernsen et al.

(10) Patent No.: US 9,883,045 B2
(45) Date of Patent: Jan. 30, 2018

(54) WIRELESS DOCKING SYSTEM

(71) Applicant: KONINKLIJKE PHILIPS N.V., Eindhoven (NL)

(72) Inventors: Johannes Arnoldus Cornelis Bernsen, Eindhoven (NL); Walter Dees, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 15/105,946

(22) PCT Filed: Dec. 19, 2014

(86) PCT No.: PCT/EP2014/078928
§ 371 (c)(1),
(2) Date: Jun. 17, 2016

(87) PCT Pub. No.: WO2015/092057
PCT Pub. Date: Jun. 25, 2015

(65) Prior Publication Data
US 2016/0323456 A1 Nov. 3, 2016

(30) Foreign Application Priority Data
Dec. 20, 2013 (EP) .................................. 13199142

(51) Int. Cl.
H04M 3/00 (2006.01)
H04M 11/00 (2006.01)
(Continued)

(52) U.S. Cl.
CPC ......... *H04M 11/007* (2013.01); *G06F 1/1632* (2013.01); *H04B 5/0075* (2013.01);
(Continued)

(58) Field of Classification Search
USPC .......................................................... 455/420
See application file for complete search history.

(56) References Cited

U.S. PATENT DOCUMENTS

2013/0309973 A1 11/2013 Raveendran
2014/0253295 A1* 9/2014 Roberts ............... H04M 1/7253
340/10.5

FOREIGN PATENT DOCUMENTS

WO WO9849815 A1 11/1998
WO WO0185085 A2 11/2001
WO WO2012117306 A1 9/2012

OTHER PUBLICATIONS

Universal Serial Bus (USB) HID Usage Tables by the USB Implementers Forum, Oct. 28, 2004 Version 1.12.
(Continued)

*Primary Examiner* — Joel Ajayi
(74) *Attorney, Agent, or Firm* — Larry Liberchuk

(57) ABSTRACT

A wireless docking system has a host (251) and a dockee device (220). The host is coupled to at least one peripheral (210, 230, 240) to constitute a wireless docking environment. The dockee is arranged for selecting a wireless docking environment from multiple available wireless docking environments (251, 252, 253), and for transmitting an identify request via the dockee communication unit to the docking host. The host is arranged for receiving the identify request via the host communication unit from the dockee device, and for responding to the identify request by generating a physical feedback at a peripheral of the host. The physical feedback, e.g. light signal or sound signal, enables a user of the dockee device at a remote distance to perceive the docking environment as selected.

14 Claims, 4 Drawing Sheets

(51) Int. Cl.
*G06F 1/16* (2006.01)
*H04M 1/725* (2006.01)
*H04W 4/00* (2009.01)
*H04B 5/00* (2006.01)
*H04W 48/18* (2009.01)
*H04W 84/12* (2009.01)

(52) U.S. Cl.
CPC ......... *H04M 1/7253* (2013.01); *H04W 4/008* (2013.01); *H04W 48/18* (2013.01); *H04W 84/12* (2013.01)

(56) References Cited

OTHER PUBLICATIONS

"Bluetooth Specification", Core Package version 2.1 + EDR, issued: Jul. 26, 2007.

* cited by examiner

WIRELESS DOCKING SYSTEM

FIELD OF THE INVENTION

The invention relates to a wireless docking system comprising a host and at least one dockee device, the host and the dockee device arranged for docking via wireless communication, the host arranged for accommodating at least one wireless docking environment comprising at least one peripheral. The host comprises a host communication unit for accommodating said wireless communication, and a host processor arranged for docking the dockee device. The dockee device comprises a dockee communication unit for accommodating said wireless communication, and a dockee processor arranged for docking with the host. A docking session enables the dockee device to use a peripheral comprised in a wireless docking environment.

The invention further relates to a dockee device, to a host, to a peripheral, a host method, a dockee method, and a computer program product for wireless docking between a host and a dockee device.

The invention relates to the field of wireless communication, e.g. via Wi-Fi, and more specific to docking of a wireless dockee device to a wireless docking environment of a host and one or more peripherals. In this context peripherals may be external devices like a display, keyboard, or mouse, or peripherals build in a host like a loudspeaker or storage unit. For example, a TV may be also a host, i.e. the host is build in the TV and constitutes a host device in combination with a number of embedded peripherals.

BACKGROUND OF THE INVENTION

Wired docking stations for portable electronic devices typically have only a single physical docking connector to dock one device at a time. The docking station may provide the portable device with power and peripheral functions not provided by the device itself, for example a large(r) screen, high(er) quality speakers, mouse and keyboard.

Wireless docking is known, for example, from WO 2012/117306A1. A wireless docking station enables a wireless secured communication between at least one slave device and a master device.

Wireless docking in a system having a host device and dockee devices may be based on using a Wi-Fi (as described in IEEE802.11) based wireless docking station. The wireless docking station may be a wireless docking host (called WDH, or host) that enables a mobile device (called dockee or dockee device) to access to a set of peripherals locally attached through a wire or wirelessly connected to the host device (such as USB mouse, HDMI display, Bluetooth headset) through a set of general message exchange protocols over a wireless link (e.g. Wi-Fi). A host coupled together with one or more wired or wireless peripherals is called a wireless docking environment.

The wireless docking host may provide information about its presence through a Wi-Fi beacon that dockees can use to select and initiate connections with a chosen host.

Alternatively, Near Field Communication (NFC) tags associated with the host or other out of band means (such as using the communications interface from a wireless power system) may be used to select and initiate a host to dock with.

US2013/0309973 describes a system for persistent wireless docking. When multiple docking environments are available a complex selection must be made. The dockee and the host may exchange messages to identify a selected persistent docking environment in accordance with a unique persistent docking environment ID as assigned by the host.

SUMMARY OF THE INVENTION

The wireless nature of the communication in the wireless docking system allows in principle a number of wireless docking environments being available, i.e. in wireless communication range of a dockee. However, when multiple wireless docking environments are available, there may be confusion on which wireless docking environment is to be selected.

It is an object of the invention to provide a system for wireless docking that enables selecting between multiple wireless environments that are available.

For this purpose, according to a first aspect of the invention, in the wireless docking system as described in the opening paragraph, the dockee processor is arranged for, before setting up the docking session, selecting a wireless docking environment from multiple available wireless docking environments, and transmitting an identify request via the dockee communication unit to the host accommodating the selected wireless docking environment. The host processor is arranged for, before setting up the docking session, receiving the identify request via the host communication unit from the dockee device, and responding to the identify request by controlling a peripheral of the host to generate a physical feedback, the physical feedback enabling a user of the dockee device outside working range of the peripheral of the host to perceive the docking environment as selected.

For this purpose a host device for use in the above system is arranged for docking via wireless communication to the dockee device, and for accommodating at least one wireless docking environment comprising at least one peripheral. The host comprises a host communication unit for accommodating said wireless communication, and a host processor arranged for docking the dockee device. The host processor is arranged for, before setting up the docking session, receiving the identify request via the host communication unit from the dockee device, and responding to the identify request by controlling a peripheral of the host to generate a physical feedback, the physical feedback enabling a user of the dockee device outside working range of the peripheral of the host to perceive the docking environment as selected.

For this purpose, a dockee device for use in the above system is arranged for docking via wireless communication. The dockee device comprises a dockee communication unit for accommodating said wireless communication, and a dockee processor arranged for docking with the host. The dockee processor is arranged for, before setting up the docking session, selecting a wireless docking environment from multiple available wireless docking environments and transmitting an identify request via the dockee communication unit to the host accommodating the selected wireless docking environment.

For this purpose, a peripheral device for use in the above system is arranged for coupling to the host to constitute a wireless docking environment, for receiving a peripheral identify request from the host, and for responding to the peripheral identify request by generating a physical feedback at the peripheral, the physical feedback enabling a user of the dockee device outside working range of the peripheral to perceive that the peripheral is comprised in the docking environment as selected.

For this purpose, a host method of wireless docking between a host and at least one dockee device, at the host arranged for accommodating at least one wireless docking environment comprising at least one peripheral, comprises, before setting up the docking session, receiving an identify request from the dockee device and responding to the identify request by controlling a peripheral of the host to generate a physical feedback, the physical feedback enabling a user of the dockee device outside working range of the peripheral of the host to perceive a docking environment as selected.

For this purpose, a dockee method of wireless docking between a host and a dockee device, the host and the dockee device arranged for docking via wireless communication, a docking session enabling the dockee device to use a peripheral comprised in a wireless docking environment as accommodated by the host, at the dockee device, comprises, before setting up the docking session, selecting a wireless docking environment from multiple available wireless docking environments, and transmitting an identify request via the dockee communication unit to the host accommodating the selected wireless docking environment, for, at the host, receiving the identify request from the dockee device and responding to the identify request by controlling a peripheral of the host to generate a physical feedback, the physical feedback enabling a user of the dockee device outside working range of the peripheral of the host to perceive the docking environment as selected.

For this purpose, according to a further aspect of the invention, the computer program product as described in the opening paragraph comprises a program that is operative to cause a processor to perform any one of the methods as described above.

The measures have the effect that dockee device can now select between different wireless docking environments and the user is provided with an indication of the selected wireless docking environment. There may be many docking environments within range of the wireless signal, e.g. in a crowded office building, since the range of wireless signals may be tens of meters. Advantageously feedback may be provided by a peripheral of the host, i.e. any peripheral attached to or internal to the host, while not involving the dockee. The feedback identifies which docking environment is selected before actually engaging in a docking session, e.g. before fully setting up a Wi-Fi connection (e.g. Wi-Fi Direct connection) for running the wireless docking session. Notably setting up the wireless docking session may require user effort for securely pairing the dockee with the host and take time for the two devices to become associated.

A host may accommodate one or more wireless docking environments, and may include one or more peripherals in a wireless docking environment. Peripherals are devices intended for user interaction, while the user is within a working range of the peripheral. For example, text is displayed on a monitor at a size to be read by a user working on a keyboard at a working distance of ca 0.5 meter. The working range of a peripheral is the range from the minimum up to the maximum practical distance to the peripheral at which a user of the peripheral is intended to work and interact with the peripheral. Peripherals include both external devices coupled to a host and devices embedded in a host device. Each accommodated combination of peripherals and host, which is available to dock with, is called a wireless docking environment. This includes the possibility of having wireless docking environments for each individual peripheral connected to or embedded in the host, when the host supports a dockee to select individual peripherals to dock with. Also, some peripherals of the host may be not included in any wireless docking environment.

Selecting the wireless docking environment may involve multiple steps, e.g. first selecting a wireless docking host, then one or more peripherals or one group of peripherals. But this can also be done in one step. The steps may be performed by the user or automatically, and may involve multiple steps in the communication protocol over the wireless medium. After selecting one of the available wireless docking environments, the identify request is transmitted from the dockee to the host accommodating the wireless docking environment that has been selected.

Subsequently, a physical feedback is generated. A physical feedback is a physical signal generated by temporarily controlling or modifying a physical parameter at a peripheral of the host, e.g. light signal or sound signal, which is detectable in response to the identify request for a human at a remote distance, i.e. out of the operational, working range of a user of the peripheral. For example, a host display screen may flash at full brightness temporarily showing a full screen white plane, a loudspeaker may produce a loud buzzing noise, or a light source that is physically near the area of the wireless docking environment may flash. Such a peripheral of the host may, although not being part of the wireless docking environment, still be used to generate the physical feedback to indicate the host and the wireless docking environment. A LED may be blinking on a peripheral that is coupled to the selected host, e.g. in a recognizable pattern known to the user of the dockee. The physical feedback is different from presenting a normal text message on a display screen for a user of the host device within working range of that screen, or a text message on a screen of a dockee. For example, a status window may represent WiFi connected devices by a readable text, and may show a new device. However, such prior art text messages are using a text size intended only for the current user within the working range of the display screen, and are not intended to be detectable from a distance by the user of the dockee. Physical feedback as currently defined comprises physical phenomena that are detectable by a human at a few meters away from the respective host or peripheral, e.g. up to more than 3 meters away.

The host processor is arranged for generating the physical feedback by controlling a peripheral of the host to generate the physical feedback. The host processor thereto accesses the peripheral, and controls a selected physical effect the peripheral may provide. For example, by issuing a reset or power down/up command, the peripheral may show a physical activity that provides the physical feedback to the dockee.

Now the physical feedback enables a user of the dockee device outside working range of the peripheral of the host to perceive the docking environment as selected. If the peripheral of the host is generating the physical feedback different from the intended wireless docking environment, the dockee may select a different wireless docking environment from the list of available wireless docking environments. This may, for example, be useful in a dense office environment, where multiple hosts are close to the dockee. For example, the dockee may wish to use a printer in front of him, and, by said physical feedback he may perceive that the printer is actually part of the wireless docking environment as selected.

The invention is also based on the following recognition. Traditionally the display screen of a host may be used to display a message when a dockee tries to dock. However, the inventors have seen that such a message is disadvantageous in that it may not be perceived by the user of the dockee device outside working range of the peripheral, and it may also disturb the contents of the display which may be in use by a different user. Moreover, where multiple similar devices are within visible or audible range of the dockee user, the user will get a clear indication by the physical feedback, e.g. a flashing light or an audible signal, which is recognizable at a distance of the respective host or peripheral.

Optionally, in the host, the host processor is arranged for generating the physical feedback by controlling at least one output unit of the the peripheral of the host. Advantageously, the host may control the output unit of the peripheral of the host, which output unit inherently outputs physically detectable signals for a human at some distance of the respective output unit. Optionally, the output unit is one of a LED indicator; a loudspeaker; or a controllable lighting element e.g. a power LED, activity LED, LED array, LED in a mouse, Ambilight of a TV set. Furthermore, the output unit may be a display, and said controlling the output unit involves pulse wise changing a physical parameter of the display, comprising one of:

pulse wise modifying the brightness or color of the display;

pulse wise replacing pre-existing contents of the display by a single plane;

pulse wise blanking the display;

while after said pulse wise changing reverting to the pre-existing contents of the display. When controlling a physical parameter of the display in a pulse wise manner, the already displayed contents need not be changed at all, so that after said pulse wise changing the display automatically reverts to the pre-existing contents of the display. Advantageously, the pulse wise change of the display parameter is easily detectible for a user of the dockee device, even up to a distance of a few meters.

Optionally, the host processor is arranged for generating the physical feedback by pulse wise controlling a lighting device that illuminates the location of the wireless environment. Pulse wise in this text includes any periodic or temporary pattern of controlling a lighting device, such as switching on/off, changing color, and mechanically changing direction of the light. Lighting devices may be controlled directly by the host, or may be accessible via a separate communication network. The location of the wireless docking environment and the light effectively produced must be known and must coincide. Provided that the configuration is known, the user of the dockee can easily perceive where the wireless docking environment is located, even in a large office space.

Optionally, the host processor is arranged for generating the physical feedback by controlling a peripheral comprised in the wireless docking environment to give the physical feedback.

In an embodiment, the host processor may be arranged for controlling the peripheral of the host to give the physical feedback using general control signals and/or general communication messages, which general control signals and/or general communication messages are intended for controlling general functions of the peripheral of the host but additionally result in the peripheral of the host giving the physical feedback. The general control signals and/or general communication messages are already supported by legacy peripherals, and may be standardized or vendor implementation specific. Advantageously, for this embodiment, the peripheral of the host need not be modified because pre-existing general signals or general commands are applied.

Optionally, the peripheral of the host is a keyboard, and the general control signals and/or general communication messages subsequently result in keyboard mode indicators being pulse wise activated.

Optionally, the peripheral of the host is a wireless charging unit, and the general control signals and/or general communication messages subsequently result in the charging being pulse wise activated. For example, the wireless charger may be able to receive signals from a device placed at the charging location, but may not be able to send messages or signals to the device under charge. By subsequently pulse wise changing the charging mechanism, the device under charge may detect that the charger is part of the wireless docking environment that received the identify request.

Optionally, the peripheral of the host is a printer, and the general control signals and/or general communication messages subsequently result in the printer being activated to at least one of:

pulse wise activating a printer mode indicator;
printing a test page.

A printer obviously can produce a physical feedback, by printing a test page. Additionally, the test page may contain some identifier as received with the identify request, e.g. a user name.

Optionally, the dockee processor is arranged for automatically transmitting the identify request when the user selects the wireless docking environment from multiple available wireless docking environments.

Optionally, the dockee processor is arranged for not transmitting the identify request when the user selects the wireless docking environment where only a single available wireless docking environment is available.

Optionally, the dockee processor is arranged for enabling the user to initiate transmitting the identify request.

Optionally, the dockee processor is arranged for enabling the user to initiate transmitting a specific identify request as the identify request, which specific identify request requests a specific peripheral of the host to give the physical feedback.

Optionally, the dockee processor is arranged for detecting the physical feedback, and transmitting a modify request, which modify request requests a specific peripheral of the host to modify the physical feedback. Advantageously, when a weak physical feedback is detected, the modify request may contain a command to increase the output level of the output unit that gives the physical feedback.

Optionally, the dockee processor is arranged for detecting the physical feedback, and where, upon said selecting an initial wireless docking environment and transmitting the initial identify request, no physical feedback is detected, selecting a further wireless docking environment and transmitting a further identify request, until physical feedback is detected. Such dockee may sequentially try a number of the available wireless docking environment, by sending subsequent identify requests, and when a response is received, i.e. the physical feedback from a peripheral of the host is detected, the dockee knows that the responding peripheral of the host identifies the last selected wireless docking environment.

Optionally, the at least one peripheral comprises at least one of a set of output peripherals like a beamer, a smartboard, a display, a loudspeaker system; or at least one of a set of input peripherals like a mouse, keyboard, room control unit, camera or microphone; or a bidirectional peripheral like a data storage unit or an optical disc unit. For example, a camera or microphone may have an indicator or light indicating "Now recording", which may be flashed.

Optionally, the identify request is only send to wireless docking environments that are not in use. Furthermore the wireless docking host may refuse to execute the identify request for wireless docking environments and peripherals that are in use, in order not to disturb their users.

Any of the above options may be combined in the dockee and/or host. Also a single device may have the host function in a first wireless docking environment, and also be a dockee to a different wireless docking environment. Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Wireless docking is about enabling portable devices (so called wireless dockees or WDs) to wirelessly connect to a group of peripherals, so that applications on the portable device can make use of these peripherals to improve the experience and productivity of working/interacting with these applications. The grouping of peripherals, the discovery/advertisement of groups of peripherals, managing the connections to groups of peripherals, is performed by a so-called wireless docking host (WDH or host), which makes functionality available through a wireless docking protocol.

Possible wireless dockees include (but are not limited to) dockee phones, laptops, tablets, portable media players, cameras, electronic watches. Possible WDHs include (but are not limited to) dedicated wireless docking station devices, display devices, audio devices, printers, PCs. The wireless docking host may also be a small (PC like) dongle with a display, USB and audio interface. Possible wireless peripherals include (but are not limited to) mice, keyboards, display devices, audio devices, webcams, printers, storage devices, USB hubs. These peripherals are connected by wire or wirelessly to the WDH. The WDH can use technologies such as Wi-Fi Miracast, USB tunneling over Wi-Fi (e.g. using Media-Agnostic USB or USB/IP) to make their functionality available through the wireless network to other devices such as dockees.

Figure 1:
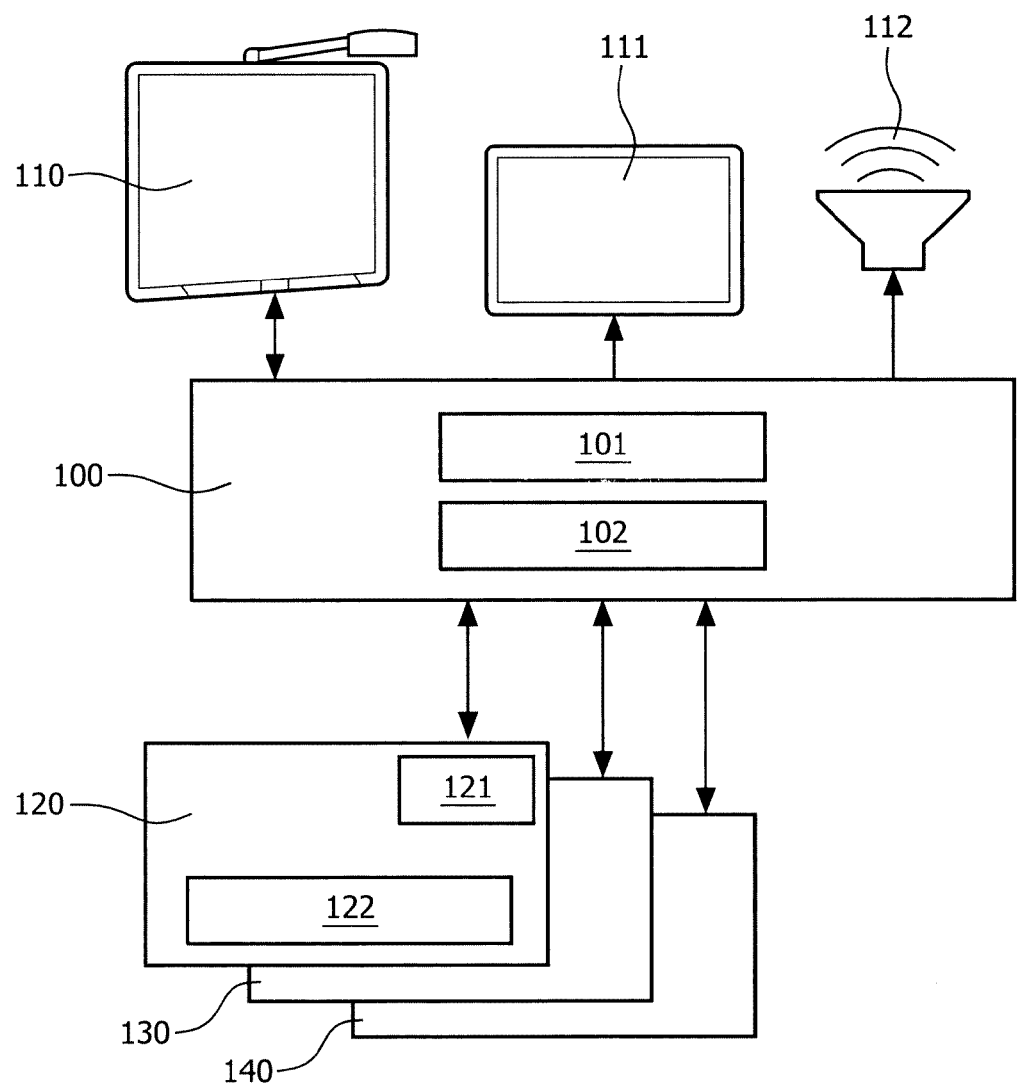
FIG. 1 shows a wireless docking system.

FIG. 1 shows a wireless docking system. The system includes a host device 100 for wireless communication with one or more dockee devices 120,130,140, for example mobile phones, laptops or tablet computers. Only the first dockee device 120 is described in detail below, but further dockee devices have similar components and functions. The host device is coupled to a number of peripherals 110,111, 112, e.g. for rendering audio or video (AV) data. It is noted that in this document AV data is used for any type of video data, audio data or a combination of video and audio data. The peripherals may include video output devices like a beamer or a display 111, graphical input/output devices like a smartboard 110 or a touch screen, audio output devices like a loudspeaker system 112 or a headphone, user input devices like a mouse or a room control unit; data processing devices like a data storage unit or a printer.

The host device 100 has a host communication unit 102 for accommodating said wireless communication, for example a WiFi unit, well known as such. The host device further has a host processor 101 arranged for docking at least one dockee device. The process of docking a wireless device to a wireless docking host (WDH) is a process of establishing a data link via the available radio channel such as WiFi or Bluetooth, and is known as such as discussed above with reference to WO 2012/117306A1. A description of Bluetooth can be found, for example, in Bluetooth Specification, Core Package version 2.1+EDR, issued: 26 Jul. 2007. The docking process involves providing access to one or more peripherals for the dockee device.

The dockee device 120 has a dockee communication unit 121 for accommodating said wireless communication with the host. In practice, there may be multiple communication units for that purpose, for example Bluetooth, Wi-Fi and 60 GHz (e.g. WiGig). The dockee device further has a dockee processor 122 arranged for docking, as a dockee device, with the host device for getting access to the at least one peripheral.

One of the ways to make wireless connectivity simpler for the user is wireless docking. In wireless docking, a so called wireless docking center makes a number of peripheral devices available to a portable device, with which the portable device can setup communication in one go. This may be through the wireless docking center or direct or a combination. Any group of peripheral devices made available by a wireless docking center is called a wireless docking environment. A wireless docking environment may contain a single host and multiple peripherals, or a wireless docking host may accommodate a number of (different) wireless docking environments. A wireless docking host may also make its peripherals available by individual selection of each one. There may also be a number of wireless docking centers in reach of a portable device to dock with.

Another way to make it more convenient for the user to use a portable device is that a peripheral device, e.g. a monitor or a TV, makes it function, its screen, available wirelessly to portable devices. It can of course frequently happen that there are several of these wireless peripheral devices in wireless reach of a portable device. Miracast, which is certified by the Wi-Fi Alliance, is a technology with which this is possible. In the current document, any device in combination with peripherals providing wireless docking host functionality to provide access to the peripheral input and/or output functions is called a wireless docking environment.

Many of the above mentioned devices will employ Wi-Fi communication to make their wireless docking environment or their function wirelessly available, e.g. by using Wi-Fi Direct. Setting up a Wi-Fi connection requires quite some steps to be taken and the exchange of a number of messages before the two devices are 'associated' over Wi-Fi. This may require quite some user involvement to make sure that the correct devices are going to be connected and takes time during which the user has to wait for the connection to be set up and started. When two devices are associated over Wi-Fi, their Wi-Fi connection is protected cryptographically and an IP connection is established.

Wi-Fi devices can make themselves discoverable wirelessly. This can be done before two devices are associated, so this is called pre-association discovery. There are several types of pre-association discovery. One is pre-association device discovery, whereby a device and some properties of the devices like its name, function, etc. can be discovered. This may be done through beacon frames and probe request frames and probe response frames. Another type is pre-association service discovery, with which the services, e.g. printing, display, etc., offered by a Wi-Fi device can be discovered through 802.11u GAS frames by others. Such discovery may include information about wireless docking environments being offered for wireless docking.

A known solution for this problem is when both devices are equipped with NFC and support connection handover. The user touches the device with which he wants to set up a Wi-Fi connection with his portable device. However, in the case of a wireless docking host, especially if it supports more than one wireless docking environment, or if it supports peripherals that are connected wirelessly to the wireless docking center, e.g. a Miracast display sink device, a Wi-Fi mouse and a Bluetooth keyboard, it may be clear by NFC touching with which wireless docking center a connection will be made but unclear to the user which peripheral devices are part of the selected wireless docking environment, i.e. which of the peripherals connected by wires to the wireless docking center and which nearby, seemingly unconnected devices are part of the selected wireless docking environment.

A portable device that wants to connect to another device, i.e. a display with wireless docking functionality, a stand-alone wireless docking center, or with a wireless docking environment, may have discovered several of these are available, for example when the user is in a flex office, internet café, etc. But which one is the correct one? Discovered devices or wireless docking environments may have a name that is communicated using discovery messages, but is the name meaningful to the user? The user may select a device or wireless docking environment and instruct his portable device to set up a Wi-Fi connection with it, but which of the devices that the user sees around him is his portable device going to be connected to? Only after having set up the Wi-Fi connection, so after association and by checking the devices around him, a user may find out with which device or wireless docking environment his portable device has been connected. This can take considerable time and user effort.

So a wireless docking system comprises a host and at least one dockee device, the host and the dockee device arranged for wireless docking via wireless communication, and the host is arranged for coupling to at least one peripheral to constitute a wireless docking environment. The host for use in the system comprises a host communication unit 102 for accommodating said wireless communication, and a host processor 101 arranged for docking the dockee device for providing access to the peripheral for the dockee device.

The known system is extended as follows. When a user selects a particular wireless docking environment from the ones that are available (within reach of his portable device), the portable device sends an identify request, i.e. a special message "Identify yourself!", to the wireless docking host that offers the selected wireless docking environment. In practice the identify request may be sent during the pre-association phase of the communication protocol, as explained later In the dockee, the dockee processor is arranged for selecting a wireless docking environment from multiple available wireless docking environments, for transmitting the identify request via the dockee communication unit to the docking host, and for docking with the host for getting access to the peripheral.

In the host, the host processor is arranged for receiving the identify request via the host communication unit from the dockee device, and for responding to the identify request by generating a physical feedback at the peripheral, the physical feedback enabling a user of the dockee device to perceive that the the peripheral are comprised in the docking environment as selected.

Upon reception of this identify request, the indicated the device starts to give physical feedback, i.e. modifying a physical output of the host or peripheral, other than a signal over Wi-Fi or a text message on a display screen of the host. The user now can easily find out which device is activated to give the physical feedback. In the case of a wireless docking environment, the wireless docking host may instruct one or more peripheral devices that are part of the indicated wireless docking environment to identify themselves. For example, in the case of USB wired connected peripherals, the wireless docking center's USB host controls what the peripheral does for giving the feedback, not the peripheral itself. So it is not really asking the peripheral device in that case, but controlling the peripheral device to provide some physical feedback useful for identifying that particular peripheral. General commands for controlling the peripheral may be used. For example for USB peripherals, commands do exist for switching on and off of LED indicators, as described in Section 11 of the document "Universal Serial Bus (USB) HID Usage Tables" by the USB Implementers Forum, Oct. 28, 2004 Version 1.12.

Alternatively, the peripheral may be adapted to receive a special peripheral identify request. Such peripheral 110,111, 112 is normally arranged for coupling to the host to constitute a wireless docking environment, and additionally arranged for receiving a peripheral identify request from the host, and for responding to the peripheral identify request by generating a physical feedback at the peripheral, the physical feedback enabling a user of the dockee device to perceive that the peripheral is comprised in the docking environment as selected.

In practice, host and peripheral devices can identify themselves in numerous ways. Virtually all devices have some sort of output that can be physically sensed by people. Examples are
- LEDs (e.g. on keyboards for CAPS LOCK and/or NUM Lock indication, position sensor of a mouse, on/off LED, etc.)
- display (small or large)
- audible output
- vibrator, etc.

Another way to indicate a device is by using a controllable lighting device, e.g. having a spot-light shine light on the device, or by a light above the table where the device is located to illuminate an appropriate part of the table.

Identifying of a host or peripheral is not done by showing some text on a screen, since this may not be readable, or may not even be visible to the dockee user standing somewhere in the neighborhood. Rather, a device may use its screen to identify itself by modifying a physical parameter pulse wise, e.g. it would flash the screen on and off or make it of one color a couple of times for a brief moment. The physical feedback may also use a screen, provided that physical feedback is given that can be perceived by a human a few meters away. For example it may be a very large text on a screen, provided that the text is in very large letters, e.g. "HERE!" displayed filling the full screen.

Optionally, the host may provide another type of feedback when there is no match between a host address in the received identify command and the respective host than when the respective host matches the intended wireless docking environment (e.g. a large text "NOT HERE", or a red light versus a green light). The dockee now is aware that that the respective host is not the intended host.

Optionally, a specific identify message may be included in the identify request. The physical feedback signal (e.g. audio and/or visual or a (LED) light pattern or animation) to output can be described in the pre-association message. The user may for example set a preferred pattern of long and short pulses he knows well. Such pattern may then be reproduced in the physical feedback, e.g. audible tones or light pulses of different lengths as defined in said pattern.

Figure 2:
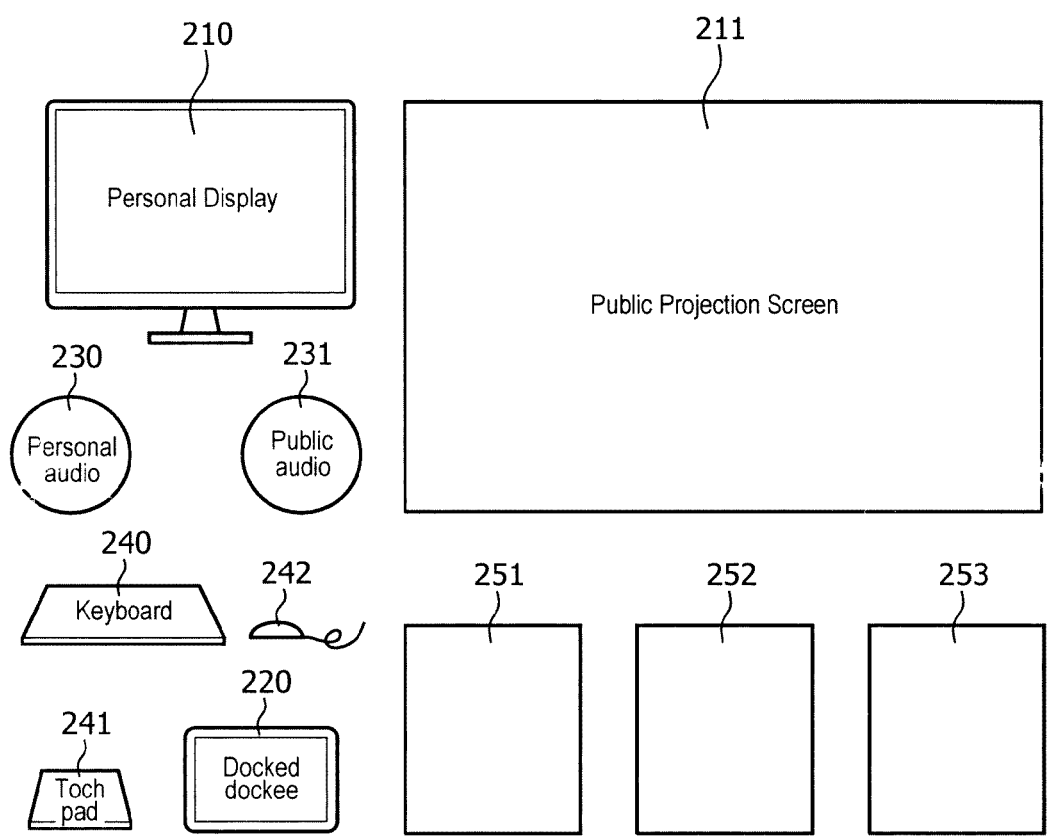
FIG. 2 shows an example of location having a multiple wireless docking environments.

FIG. 2 shows an example of location having a multiple wireless docking environments. The figure shows three host devices 251,252,253 connected to a set of peripherals, for example a display 210, a projection screen 211, personal audio 230 or public audio speakers 231, a keyboard 240, a mouse 242 and a touchpad 241. The connection between a respective host and individual peripherals is not known to the dockee device 220 or its user. Further peripherals may also be coupled via peripheral interfaces, like an Ethernet connection 210 for high speed access to peripherals or internet access to be used by the dockees, a USB interface which may support multiple peripheral connections, or HDMI. The respective hosts 251, 252, 253 may each provide one or more wireless docking environments, which are all available to the dockee 220. The dockee may select a wireless docking environment and transmit the identify request as explained above, whereas the peripherals will respond by giving physical feedback.

The host processor may be arranged for generating the physical feedback by controlling at least one output unit of the the peripheral. The output unit may be a display, and said controlling the output unit involves pulse wise changing a physical parameter of the display, comprising one of:
- pulse wise modifying the brightness or color of the display;
- pulse wise replacing pre-existing contents of the display by a single plane;
- pulse wise blanking the display;

while after said pulse wise changing reverting to the pre-existing contents of the display.

The host processor may be arranged for generating the physical feedback by pulse wise controlling a lighting device that illuminates the location of the wireless environment. The speed of the pulses is chosen to be easily detectable by a human, e.g. around a few Hz. The host processor may be arranged for generating the physical feedback by controlling the peripheral to give the physical feedback.

In an embodiment of the host, the host processor is arranged for controlling the peripheral to give the physical feedback using general control signals and/or general communication messages, which general control signals and/or general communication messages subsequently result in the peripheral giving the physical feedback. For example, the peripheral may be a keyboard, and the general control signals and/or general communication messages subsequently result in keyboard mode indicators being pulse wise activated, such as the Cap Lock, or Function LED. Also, the peripheral may be a wireless charging unit, and the general control signals and/or general communication messages subsequently result in the charging being pulse wise activated, as further elucidated below. The peripheral may further be a printer, and the general control signals and/or general communication messages subsequently result in the printer being activated to at least one of pulse wise activating a printer mode indicator, e.g. the out-of-paper LED, or printing a test page.

In an embodiment of the dockee, the dockee processor is arranged for automatically transmitting the identify request when the user selects the wireless docking environment from multiple available wireless docking environments. Also, the dockee processor may be arranged for not transmitting the identify request when the user selects the wireless docking environment where only a single available wireless docking environment is available. The identify request is without much effect, and only disturbs users, if only a single wireless docking environment is available. Also, the dockee may enable the user to initiate transmitting the identify request, e.g. manually or by a setting in a menu. Also, the dockee may enable the user to initiate transmitting a specific identify request as the identify request, which specific identify request requests a specific peripheral to give the physical feedback.

For example, the user may only be interested in a printer or scanner, which may be indicated by the user via the dockee user interface, e.g. a touch screen. Also, the dockee processor may be arranged for detecting the physical feedback, and transmitting a modify request, which modify request requests a specific peripheral to modify the physical feedback. The modify request may be to change the frequency of the audible feedback signal.

Optionally, the dockee processor is arranged for detecting the physical feedback, and where, upon said selecting an initial wireless docking environment and transmitting the initial identify request, no physical feedback is detected, selecting a further wireless docking environment and transmitting a further identify request, until physical feedback is detected. For example, by positioning the camera of a dockee near a LED indicator on a printer, the dockee may try sending identify requests to multiple wireless docking environments until a response on the LED in the camera image is detected.

In practice, a user may have a portable device that has a Wi-Fi radio. The portable device is using its Wi-Fi radio to discover Wi-Fi peripheral devices, e.g. a display that supports Miracast or a Wi-Fi mouse, or to discover a wireless docking center. The portable device can show the user which devices are within radio reach. The user selects one, but before connecting with it, the user instructs his portable device to help identify the selected device. If the selected device is a Wi-Fi peripheral, e.g. a display supporting Miracast, the portable device sends a special message, said identify request, to the Wi-Fi peripheral before the portable device has set up a connection with the Wi-Fi peripheral, e.g. a Wi-Fi Direct connection. This can be achieved in several ways, as follows.

In a first practical embodiment the identify request is defined as a new 802.11 management frame, for example an "Identification" management frame, using a subtype value not used for other 802.11 management frame types as defined in Section 7.1.3.1.2. of IEEE Std 802.11-2007 or as a 802.11 management frame of type Action with a (vendor-specific) information element and category value as defined in Sections 7.2.3.12 and 7.3.1.11. of IEEE Std 802.11-2007. This new management frame can be sent by the portable device to the Wi-Fi peripheral. The MAC address of the Wi-Fi peripheral that was selected by the user can be used either as destination address of the Wi-Fi frame and/or as part of the payload of a new management frame (if the Wi-Fi frame would be broadcasted). Upon receiving the new management frame, the Wi-Fi peripheral will interpret this message and verify if the MAC address provided in the message matches its own MAC address. If so, then it will identify itself by providing the physical feedback using the mechanisms as described above.

In a second practical embodiment the identify request is defined by adding a new (vendor-specific) information element (IE), for example an "Identification" IE to an existing 802.11 management frame as defined in Section 7.3.2 of IEEE Std 802.11-2007 or to one of the P2P public action frames as defined in Section 4.2.8 of the Wi-Fi Direct/Peer-to-Peer (P2P) Technical Specification. Good candidates for this would be a Probe Request frame and Provision Discovery Request frame. The MAC address of the Wi-Fi peripheral that was selected by the user can be used either as destination address of the Wi-Fi frame and/or as part of the attributes with the (vendor-specific) information element (in case if the Wi-Fi frame would be broadcasted). Upon receiving a management or P2P public action frame with the new (vendor-specific) information element, the Wi-Fi peripheral will interpret this message and verify if the MAC address provided in the message matches its own MAC address. If so, then it will identify itself by providing the physical feedback using the mechanisms as described above.

In a third practical embodiment the identify request is defined by adding a new (vendor-specific) attribute or setting a new attribute value, for example an "Identification" attribute or "Identification" attribute value as part of an existing information element (IE) of an existing management frame defined in Section 7.3.2 of IEEE Std 802.11-2007 or in an existing information element (IE) of one of the P2P public action frames as defined in Section 4.2.8 of the "Wi-Fi Peer-to-Peer (P2P) Technical Specification" Version 1.2 issued on 2011-12-14 by the Wi-Fi Alliance Technical Committee P2P Task Group. Good candidates for this would be to add a new attribute to the P2P IE or WSC IE in a Probe Request frame and Provision Discovery Request frame as defined in Section 4.2.2 and 4.2.8.9 of the Wi-Fi Direct/Peer-to-Peer (P2P) Technical Specification, or set a new attribute value of an existing attribute, such as the Session Information Data Info field in the Provisions Discovery Request frame as defined in the Wi-Fi Direct Services Addendum to the Wi-Fi Direct/Peer-to-Peer (P2P) Technical Specification. The MAC address of the Wi-Fi peripheral that was selected by the user can be used either as destination address of the Wi-Fi frame and/or as part of the new (vendor-specific) attribute in an existing information element (in case if the Wi-Fi frame would be broadcasted). Upon receiving a management or P2P public action frame with the new (vendor-specific) attribute in an existing information element, the Wi-Fi peripheral will interpret this message and verify if the MAC address provided in the message matches its own MAC address. If so, then it will identify itself by providing the physical feedback using the mechanisms as described above.

In a fourth practical embodiment the identify request is defined as a new query, for example an "Identify yourself" query string, for the Query Data field in a Service Request TLV of a Service Discovery Query Frame as defined in Section 4.2.10.1 of the "Wi-Fi Peer-to-Peer (P2P) Technical Specification". Since such service discovery query frame is specifically sent to a single destination device, the matching of the MAC address of the Wi-Fi peripheral that was selected by the user with the Wi-Fi peripheral's own MAC address is implicit. So upon receiving a Service Discovery Query Frame with the new query as part of the Query Data field in the Service Request TLV, the Wi-Fi peripheral will identify itself by providing the physical feedback using the mechanisms as described above.

When the selected Wi-Fi peripheral also is a wireless docking host, the same "Identify yourself!" signal is sent to the wireless docking host. In addition to having its own specific physical feedback mechanism, the wireless docking host may identify itself by having all the peripherals it manages, e.g. built-in peripherals, peripherals attached by USB or other wired connections, peripherals connected to it wirelessly (Bluetooth, Wi-Fi, ZigBee, etc.), identify themselves. E.g. the wireless docking center can have a USB keyboard identify itself by switching on and of its CAPS LOCK, NUM LOCK, SCROLL LOCK and other LEDs, by sending, as USB host, a 5-bit absolute report to the USB keyboard via a Set_Report(Output) request.

When the user has selected a specific wireless docking environment that a wireless docking host offers, also the "Identify yourself!" signal is sent to the wireless docking host. However, this signal is now extended with the indication of which wireless docking environment the user has selected and the wireless docking host now only instructs the peripherals that are part of the selected wireless docking environment to identify themselves. The wireless docking host may also identify itself, which is especially useful in case the user needs to operate something on the wireless docking center itself for making the connection, e.g. if the user needs to read a PIN code printed on the wireless docking host for the pairing procedure with the portable device, or push a button on the wireless docking host for pairing it with the portable device.

It is possible that after receiving the identify request, the device responds differently when the device is already in use by someone else (e.g. using a red light instead of a green light), in particular to not bother the user behind that device.

In a further embodiment, the portable device can detect the physical feedback of the selected device (e.g. through microphone, webcam, sensor). The portable device may be able to provide guidance information to the user via its user interface (UI) based on the physical feedback detection. The portable device and the selected device may enter a feedback loop to strengthen/weaken/change the physical feedback from the selected device based on the detected signal or other parameters (such as user input) to further guide the user to the correct device.

In a further embodiment, the portable device is placed on the charging mat of a wireless charger, which charger is part of a wireless docking environment or coupled to some other Wi-Fi device. The portable device tries to connect with the Wi-Fi radio of the wireless docking host or Wi-Fi device connected to the charging mat. The wireless docking host should let the portable device know when it was put on the charging mat that it has the capability for the following procedure. The portable device sends an identify request to the first host, or the host with the best signal strength, on its list of discovered Wi-Fi devices or wireless docking hosts. The device that receives the identify request sends a message through its wireless charger, if it is equipped with a wireless charger, to the device being charged. If the device being charged happens to be the portable device that sends the identify request, the portable device knows that it has selected the right device. If not, the portable device selects the next device on its list of discovered devices an identify request, until the portable device gets an acknowledgement through the wireless charger.

In practice, a problem with such embodiment according to the Qi wireless charging system only supports data communication from the device being charged to the charger. However, the charger could send a simple message by interrupting the charging for one or more brief moments. The QI wireless charging system is described in: "System Description Wireless Power Transfer, Volume I: Low Power, Part 1: Interface Definition Version 1.0.1, Version 1.0.1, October 2010" available from the Wireless Power Consortium: http://www.wirelesspowerconsortium.com/.

Figure 3:
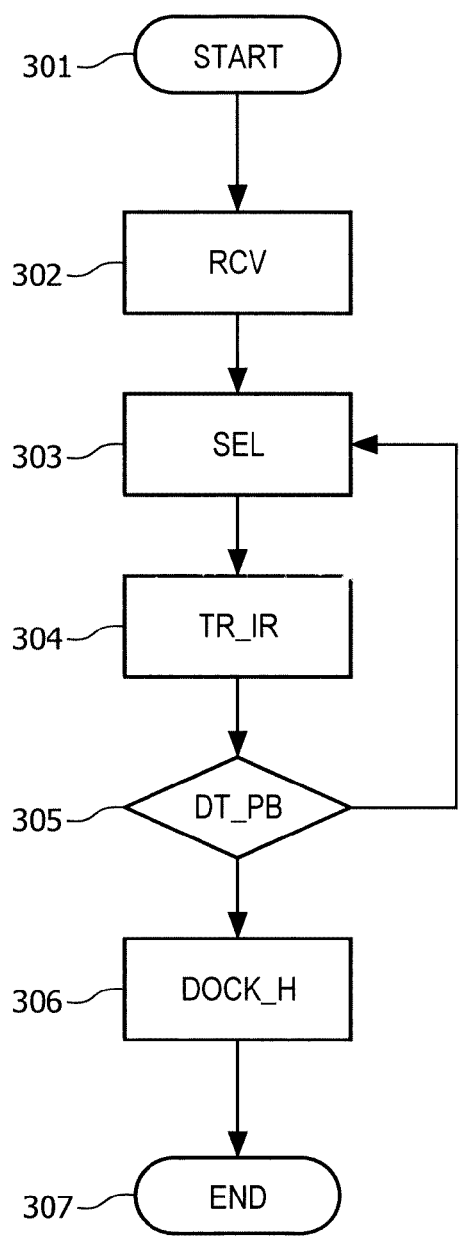
FIG. 3 shows a method of wireless docking at a dockee.

FIG. 3 shows a method of wireless docking at a dockee. The dockee method enables wireless communication between a dockee and one or more hosts. The host and the dockee device have been elucidated with reference to FIGS. 1 and 2. The dockee method initially starts at START 301 and continues by receiving radio signals of wireless docking environments, at step RCV 302. Subsequently, a wireless docking environment is selected at step SEL 303, i.e. a wireless docking environment is chosen from multiple available wireless docking environments. Subsequently, at step TR_IR "transmit identify request" 304, an identify request is transmitted via the dockee communication unit to the docking host. At the host, the identify request is received from the dockee device, and the host responds to the identify request by generating a physical feedback at the the peripheral.

The physical feedback enables a user of the dockee device to perceive that the the peripheral are comprised in the docking environment as selected. Detecting the physical feedback is performed in step DT_PB "detect physical feedback" 305. If the physical feedback is not detected, or detected at a wireless docking environment differing from the required wireless docking environment, the method returns to step SEL 303 to select a different wireless docking environment.

If the dockee finds that the selected wireless docking environment indeed is the wanted wireless docking environment, the method continues at step DOCK_H, "docking to the host" 306, for docking with the host for getting access to the one or more peripherals and then the method ends at node END 307.

Figure 4:
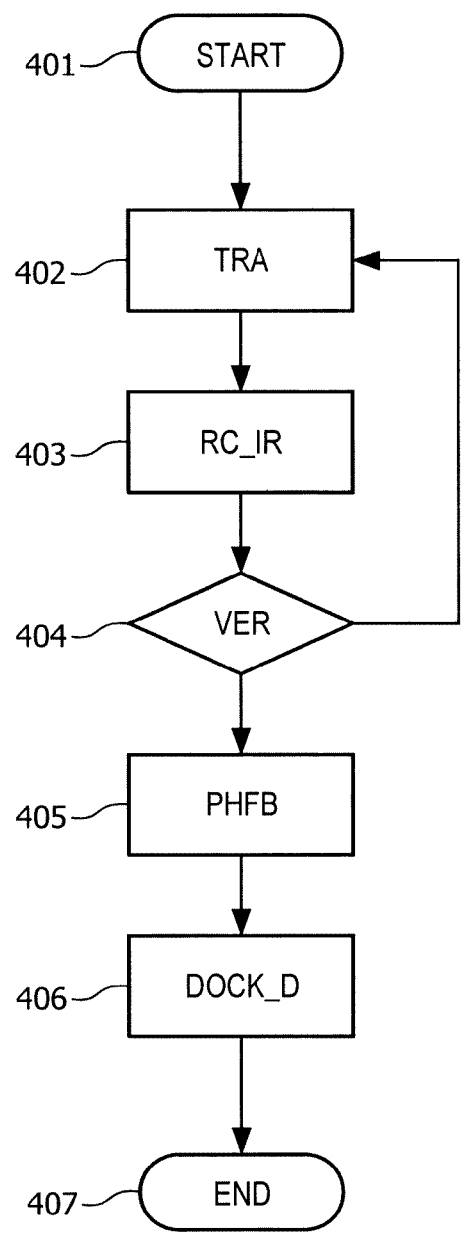
FIG. 4 shows a method of wireless docking at a host.

FIG. 4 shows a method of wireless docking at a host. The host method enables wireless communication between a host and one or more dockee devices. The host and the dockee device have been elucidated with reference to FIGS. 1 and 2. The host method initially starts at START 401 and continues by transmitting radio signals of the wireless docking environment or multiple wireless docking environments accommodated by the host, at step TRA "transmit" 402. Subsequently, a wireless docking environment is selected at the dockee, i.e. a wireless docking environment is chosen from multiple available wireless docking environments. Subsequently, at step RC IR "receive identify request" 403, an identify request is received via the docking communication unit from the dockee device. In a step VER "verify" 404 it is verified whether the identify request is actually for the host. If not, the method returns to step TRA transmit.

Subsequently, when the identify request is targeted at the host, the method continues at step PHPB "generate physical feedback" 404. Now the method responds to the identify request by generating a physical feedback at the the peripheral. The physical feedback enables a user of the dockee device to perceive that the the peripheral are comprised in a docking environment as selected. If the dockee now continues, i.e. when the dockee detects the physical feedback at a wireless docking environment that has been selected, the method continues at step DOCK_D "docking of the dockee", for docking the dockee device for providing access to the peripheral for the dockee device. Finally the method ends at node END 407.

In practice the methods may be implemented in host software (host method) and dockee software (dockee method), e.g. a so-called app. Such computer program products are for wireless docking between a host and a dockee device, and comprise a program operative to cause a processor to perform the host or dockee method.

Although the invention has been mainly explained by embodiments using wireless docking, the invention is also suitable for any wireless system where a portable device (having the dockee role) wants to connect to one or more wireless devices, or needs to connect to, or share, one or more peripherals. It is to be noted that the invention may be implemented in hardware and/or software, using programmable components.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A wireless docking system, comprising:
    a host configured to accommodate at least one wireless docking environment including a peripheral, the host comprising a host communication unit and a host processor; and
    a dockee device for docking with the host, the dockee device comprising a dockee communication unit and a dockee processor for selecting a wireless docking environment from multiple wireless docking environments, wherein the dockee processor is configured to transmit an identify request via the dockee communication unit to the host in the selected wireless docking environment, the identify request requesting the peripheral to provide an auditory or visual feedback that is detectable at a remote distance, wherein the host processor is configured to receive the identify request via the host communication unit and respond by controlling the peripheral to generate the feedback, and wherein the host processor is configured to reject the identify request when the peripheral is in use.

2. A host in a wireless docking system, comprising:
a host communication unit; and
a host processor for docking via wireless communication with a dockee device, wherein the host processor is configured to accommodate at least one wireless docking environment including a peripheral for use by the dockee device, wherein the host processor is further configured to receive an identify request via the host communication unit from the dockee device, the identify request requesting the peripheral to provide an auditory or visual feedback that is detectable at a remote distance, wherein the host processor is further configured to respond to the identify request by controlling the peripheral to generate the feedback, and wherein the host processor is configured to reject the identify request when the peripheral is in use.

3. The host according to claim 2, wherein the feedback is generated by controlling at least one output unit of the peripheral.

4. The host according to claim 3, wherein the at least one output unit is a display controlled by at least one of:
modifying a brightness or a color of the display;
replacing pre-existing contents of the display by a single plane; and
blanking the display.

5. The host according to claim 2, wherein the feedback is generated by controlling a lighting device that illuminates a location of the wireless environment.

6. The host according to claim 2, wherein the host processor is configured to control the peripheral to generate the feedback by using general control signals or general communication messages, which are used for controlling general functions of the peripheral.

7. The host according to claim 2, wherein the peripheral comprises at least one of a keyboard, a wireless charging unit, and a printer.

8. A dockee device in a wireless docking system, comprising:
a dockee communication unit; and
a dockee processor for docking via wireless communication with a host, wherein the host is configured to accommodate at least one wireless docking environment including a peripheral for use by the dockee device, wherein the dockee processor is further configured to select a wireless docking environment from multiple wireless docking environments, the dockee processor transmitting an identify request via the dockee communication unit to the host in the selected wireless docking environment, the identify request requesting the peripheral to provide an auditory or visual feedback that is detectable at a remote distance, wherein the host is configured to reject the identify request when the peripheral is in use.

9. The dockee device according to claim 8, wherein the dockee processor is configured to perform at least one of:
transmitting the identify request when the user selects the wireless docking environment from the multiple wireless docking environments;
not transmitting the identify request when the user selects the wireless docking environment where only a single wireless docking environment is available;
enabling the user to initiate transmitting the identify request;
enabling the user to initiate transmitting a specific identify request for a specific peripheral to give the feedback; and
detecting the feedback and transmitting a modify request to request the specific peripheral to modify the feedback, the feedback being remotely detectable.

10. The dockee device according to claim 8, wherein no feedback is detected when selecting an initial wireless docking environment and transmitting the identify request, selecting another wireless docking environment and transmitting another identify request until the feedback is detected.

11. A method of wireless docking between a host and at a dockee device, comprising:
arranging the host and the dockee device for docking via wireless communication for setting up a docking session;
accommodating at least one wireless docking environment including a peripheral;
enabling the dockee device to use the peripheral via the docking session;
receiving an identify request from the dockee device, the identify request requesting a peripheral to provide an auditory or visual feedback that is detectable at a remote distance; and
responding to the identify request by controlling the peripheral to generate the feedback, wherein the host is configured to reject the identify request when the peripheral is in use.

12. A method of wireless docking between a host and a dockee device, comprising:
arranging the host and the dockee device for docking via wireless communication for setting up a docking session;
accommodating at least one wireless docking environment including a peripheral;
enabling the dockee device to use the peripheral via the docking session;
selecting a wireless docking environment from multiple available wireless docking environments;
transmitting an identify request via a dockee communication unit to the host that accommodates the selected wireless docking environment, the identify request requesting a peripheral to provide an auditory or visual feedback that is detectable at a remote distance;
receiving the identify request from the dockee device; and
responding to the identify request by controlling the peripheral to generate the feedback, wherein the host is configured to reject the identify request when the peripheral is in use.

13. A non-transitory computer-readable medium having one or more executable instructions stored thereon, which when executed by a processor, cause the processor to perform a method for wireless docking between a host and at a dockee device, the method comprising:
arranging the host and the dockee device for docking via wireless communication for setting up a docking session;
accommodating at least one wireless docking environment including a peripheral;
enabling the dockee device to use the peripheral via the docking session;
receiving an identify request from the dockee device, the identify request requesting a peripheral to provide an auditory or visual feedback that is detectable at a remote distance; and responding to the identify request by controlling the peripheral to generate the feedback, wherein the host is configured to reject the identify request when the peripheral is in use.

14. A non-transitory computer-readable medium having one or more executable instructions stored thereon, which when executed by a processor, cause the processor to perform a method for wireless docking between a host and at a dockee device, the method comprising:

arranging the host and the dockee device for docking via wireless communication for setting up a docking session;

accommodating at least one wireless docking environment including a peripheral;

enabling the dockee device to use the peripheral via the docking session;

selecting a wireless docking environment from multiple available wireless docking environments;

transmitting an identify request via a dockee communication unit to the host accommodating the selected wireless docking environment, the identify request requesting a peripheral to provide an auditory or visual feedback that is detectable at a remote distance;

receiving the identify request from the dockee device; and responding to the identify request by controlling the peripheral to generate the feedback, wherein host is configured to reject the identify request when the peripheral is in use.

* * * * *